Dec. 13, 1966

B. E. STEVENSON ET AL 3,291,004

PNEUMATIC BRAKE SETTING MEANS WITH EMERGENCY
MECHANICAL ACTUATOR THEREFOR
Original Filed June 24, 1963

INVENTORS.
BILLY E. STEVENSON
JOHN T. OSTGAARD
BY Elliott & Pastoriza
ATTORNEYS.

United States Patent Office 3,291,004
Patented Dec. 13, 1966

3,291,004
PNEUMATIC BRAKE SETTING MEANS WITH EMERGENCY MECHANICAL ACTUATOR THEREFOR
Billy E. Stevenson, Huntington Beach, and John T. Ostgaard, Los Angeles, Calif., assignors, by mesne assignments, to Royal Industries, Inc., a corporation of California
Continuation of application Ser. No. 289,966, June 24, 1963. This application Apr. 6, 1965, Ser. No. 448,558
2 Claims. (Cl. 92—63)

This application is a continuation of our application for United States Letters Patent Ser. No. 289,966, filed June 24, 1963, entitled "Pneumatic Brake Setting Means," now abandoned.

This invention relates generally to pneumatic braking systems such as used on trucks and trailers and more particularly to an improved pneumatic brake setting means incorporating emergency fail-safe type mechanical brake setting means.

In copending patent application Ser. No. 97,368, filed Mar. 21, 1961, and entitled "Fluid Operating Braking System," there is disclosed a pneumatic braking system which includes a mechanically powered alternate brake setting means. In the preferred embodiment of this alternate brake setting means the normal pneumatic system for operating the brakes together with the alternate brake setting means is incorporated in a single casing structure. This casing structure is disposed adjacent to the brake drums on the vehicle or trailer, as the case may be, to operate the brake shoes.

As shown and described in the aforementioned copending application, the casing includes a typical brake booster having an actuating rod means for coupling the same to the brake mechanism. This booster incorporates a heavy-duty diaphragm for actuating the rod means in response to pressurized air received on one side of the diaphragm. The rod means is resiliently positioned against the opposite side of the diaphragm so that when the diaphragm is moved in response to pressurized air, the rod means will actuate the brake drums. When the pressurized air is exhausted the rod means will release the brakes.

The casing also includes a second or emergency chamber disposed to the rear of the booster. This second chamber incorporates a second heavy-duty diaphragm to the rear of which there is disposed powerful spring means. A rigid force transmitting member, in turn, is disposed between the first and second diaphragms such that when the powerful spring means is released, this force transmitting member will urge the first diaphragm forwardly and thus actuate the rod means to set the brakes. The powerful spring means will only be released to set the brakes in the event of loss of air pressure in the forward portion of the second chamber.

In order that a vehicle may be moved after loss of air pressure, such as might result from a leak in the pneumatic line or failure of the compressor to operate, it is desirable to provide means for mechanically retracting the powerful spring means to release the brakes thereby permitting movement of the vehicle. In the copending application referred to, such a mechanical lockout means is incorporated as a part of the casing structure and extends from the rear of the casing structure normally. Thus, the overall length of the casing structure is increased rendering it awkward to mount the casing and subjecting the exposed part of the lockout to the elements and various hazards. Further, the powerful spring means themselves require, in the particular design disclosed, a relatively long operating space, again increasing the overall length of the casing structure.

With the foregoing considerations in mind, it is a primary object of this invention to provide an improved and simplified pneumatic brake setting means in combination with emergency brake setting means, all housed within a single casing unit of minimum overall length considerably shorter than has been required heretofore, and yet from which the same advantages may be realized.

More particularly, it is an object to provide a pneumatic brake actuating and setting means which includes mechanical means for releasing the brakes in the event of failure of pressurized air and yet in which the provision of such mechanical means does not increase the overall length of the casing structure.

Another important object is to provide an improved pneumatically operated brake setting means incorporating powerful spring means of a unique design when considered in the overall combination for again enabling minimization of the overall length of the casing structure without sacrificing the required strength of the powerful springs employed and featuring a floating inner end free of connection to the diaphragm and of guide support from stationary components of the assembly.

Briefly, these and many other objects and advantages of this invention are attained by providing a casing structure having a rod actuating means extending from one end adapted to be coupled to the brake mechanism of the vehicle. The casing structure itself includes a first chamber incorporating a first heavy-duty diaphragm which is responsive to pressurized air to extend the rod means and thus set the brakes. Similarly, exhaust or relieving of this pressurized air will permit the rod means to retract within the first chamber and thus release the brakes.

The same casing unit also includes a second chamber disposed to the rear of the first chamber and having a common wall therewith provided with an opening. This second chamber incorporates a second heavy-duty diaphragm. A rigid force transmitting member has one end passing through the opening in the common wall to bear against the rear surface of the first diaphragm and its other end in engagement with the front surface of the second diaphragm in the second chamber. Powerful spring means preferably of barrel configuration are disposed to the rear of the second diaphragm to urge the second diaphragm towards the first diaphragm. Means are provided for providing pressurized air to the front portion of the second chamber to hold the powerful spring means in a compressed state.

In the event of loss of pressurized air resulting in the powerful spring means setting the brakes through the medium of the rigid force transmitting member, the desired mechanical lockout means for retracting the spring takes the form of a threaded stud and nut normally carried captively on the side of the casing to avoid increasing the overall length of the casing. The rear portion of the second chamber housing the powerful spring means, in turn, includes a unique annular plate structure disposed between the floating inner end of the powerful springs and the rear surface of the second heavy-duty diaphragm against which the powerful spring means acts. This plate is provided with fast-action disconnect means adapted to be engaged by one end of the threaded lockout stud when the threaded stud is received within a rear access opening in the second chamber. The threaded stud and an associated nut may then be employed to retract the powerful spring means. When not in use, the stud and nut are simply replaced in the protective carrying portion on the side of the casing structure. This unique provision of the mechanical lockout means coupled with the use of the barrel type helical coil spring for the powerful spring means wherein the end coils will fit within the center coils when the spring is compressed enables the overall length of the casing to be minimized without sacrificing the effectiveness of the structure in setting and releasing the brakes.

A better understanding of the invention will be had by now referring to a preferred embodiment thereof as illustrated in the accompanying drawings, in which.

Figure 1:
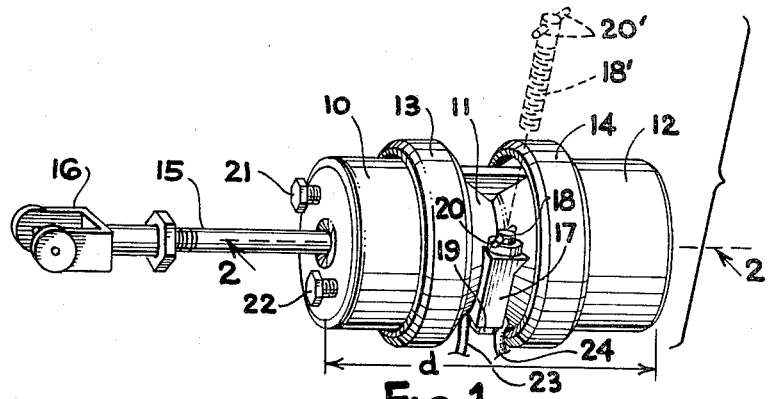
FIGURE 1 is an overall perspective view of the improved pneumatic brake setting means of this invention.

Referring first to FIGURE 1, the brake setting means includes a casing structure having a front cup-shaped casing section 10, an intermediate section 11, and a rear cup-shaped casing section 12, it being pointed out that housing sections 11 and 12 take the place of the usual end cap of the brake booster housing 10.

The three sections are held together by encircling clamps or bands 13 and 14. As shown, there is provided a brake setting actuating rod means 15 protruding from the front portion of the casing and terminating in a yoke structure 16 adapted to be directly coupled to the cam mechanism for operating the brake drums of the vehicle. The arrangement is such that forward extended movement of the rod means 15 from the casing structure serves to actuate or set the brakes and retracting movement of the rod means 15 will release the brakes.

In accordance with a feature of this invention, the casing structure is provided on one side with a pocket 17 arranged to receive a threaded stud 18 having a nut 19 threaded to its lower end to hold the stud within the pocket 17. The upper portion of the stud includes laterally extending projections 20 constituting an engaging means, the purpose for which will become clearer as the description proceeds. As indicated by the dotted lines in FIGURE 1, the stud 18 and nut 19 may be easily removed from the pocket 17 by simply unthreading the nut and lifting the stud upwardly as shown at 18'.

Also illustrated in FIGURE 1 are suitable mounting lugs 21 and 22 for the casing structure to enable mounting the same adjacent to the brake drums of the vehicle. Suitable air pressure inlet and exhaust lines, such as indicated at 23 and 24 are provided to enable pneumatic operation of the mechanism within the casing. As indicated in FIGURE 1, the overall length of the casing structure is indicated at $d$ and, in accordance with an important feature of this invention, this overall length is maintained at a minimum value.

Figure 2:
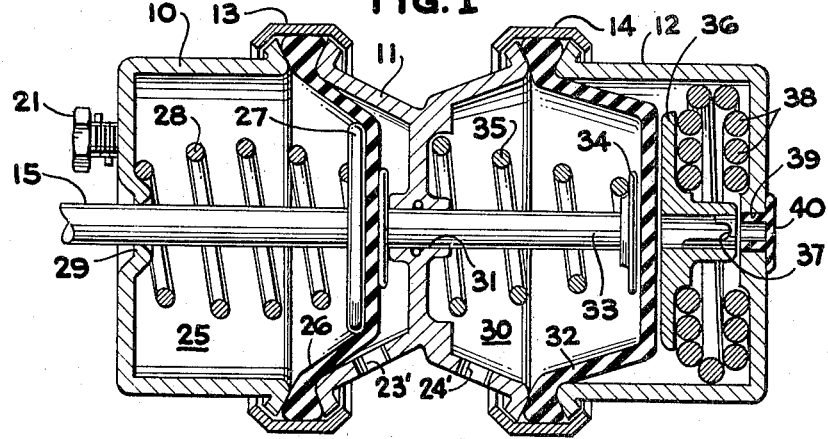
FIGURE 2 is a cross-section taken generally in the direction of the arrows 2—2 of FIGURE 1, illustrating the relative positions of components when the brakes are in released condition.

Referring now to FIGURE 2, the front portion of the casing structure itself includes a first chamber 25 incorporating a first or booster heavy-duty diaphragm 26, the peripheral edges of which may be clamped between the casing sections 10 and 11 by means of the clamping ring 13. The rod means 15 in turn terminates in an annular plate 27 resiliently held against the front face of the diaphragm 26 as by a spring 28. Means are provided in the form of the opening 29 from which the rod means 15 extends to vent the front portion of chamber 25 to atmosphere. The portion of the chamber to the rear of the diaphragm 26 in turn is arranged to receive pressurized air from the line 23 of FIGURE 1 through a suitable inlet port 23', as shown in FIGURE 2.

With the arrangement described thus far, the spring 28 will normally hold the plate 27 and diaphragm 26 in their extreme right hand or rearward positions so that the rod means 15 is retracted and the brakes of the vehicle are released. When it is desired to operate the brakes, pressurized air is received through the port 23' to the rear of the diaphragm 26, thus urging the diaphragm forwardly to extend the rod means 15 and actuate the brake drum. Release of the brakes is effected by simply exhausting air through the same port 23' or a suitable exhaust port (not shown).

The alternate emergency brake setting portion incorporated within the casing structure is shown to the right of the first chamber 25. This latter emergency mechanism includes a chamber 30 disposed to the rear of the chamber 25 and having a common wall portion therewith defined by the center casing section 11. As shown, this common wall portion 11 includes an opening 31. Within the second chamber 30 there is incorporated a second heavy-duty diaphragm 32. A rigid force transmitting member 33 in turn passes in sealing relationship through the opening 31 to bear against the rear surface of the first heavy-duty diaphragm 26, and has its other end resiliently bearing against a plate 34 in engagement with the front surface of the second heavy-duty diaphragm 32. The resilient engagement is effected by a spring 35 in the front portion of the second chamber 30. The front portion of the chamber 30 is adapted to receive pressurized air through an inlet port 24' which communicates with the inlet line 24 described in FIGURE 1. Thus, by admitting pressurized air to the second chamber 30, the second diaphragm 32 will be urged rearwardly to the right as shown.

Figure 3:
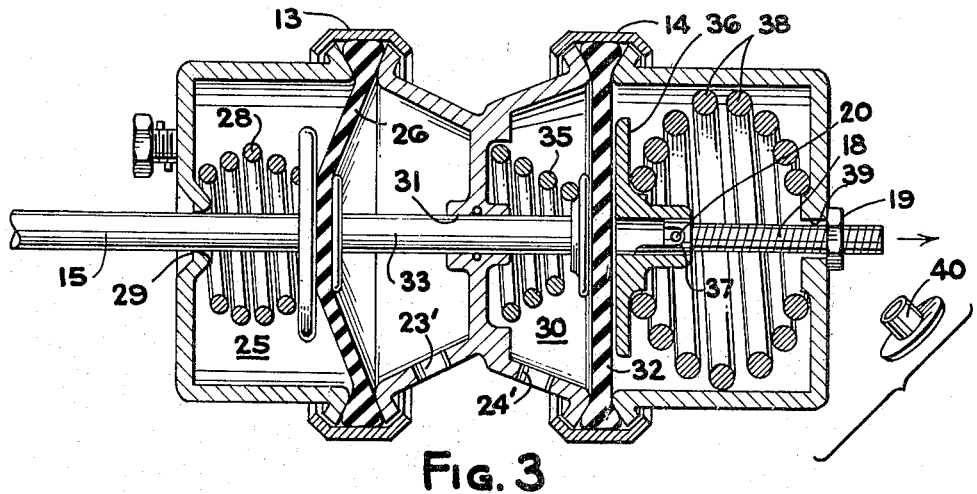
FIGURE 3 is another cross-section similar to FIGURE 2, but illustrating the relative positions of the components when the brakes are partially set.

Housed within casing 12 is a powerful coil spring 38 preferably of barrel configuration, as is best shown in FIGURE 3. It will be understood that the diameters of adjacent convolutions preferably differ sufficiently for nesting of the end convolutions within the larger midsection convolutions in the manner best shown in FIGURE 2, this being in the interest of maximum compactness and lightness without sacrifice in performance characteristics. Of importance too is the fact that the inner end of spring 38 is floatingly supported without need for aid from guide means heretofore customarily employed. In other words, the outer end of the spring nests over a boss or the like projecting inwardly from the end wall of casing 12 and the inner spring end nests over complementally shaped boss means centrally of the bearing plate 36. The spring is so dimensioned that its largest convolution is smaller in diameter than the internal diameter of casing 12 and does not bind thereagainst when fully compressed, as is evident from FIGURE 2. However, the lower outer surface of the largest convolution may have sliding contact with the inner lower side wall of casing 12 for self-evident reasons, and cooperates therewith in floatingly supporting the inner end of the spring and plate 36 against the center of diaphragm 32.

Owing to the described floating mode of supporting plate 36, it will be understood that there is no opportunity for the described emergency components, namely, plate 36 and spring 38, to become twisted or to bind against any other component. Malfunctions from these sources are therefore completely avoided. Likewise, there are no close manufacturing tolerances to be observed and checked during manufacture and assembly. Additionally, temperature changes cannot affect the operation nor can the components under consideration become fouled with dirt and foreign matter.

It will be understood that bearing plate 36, as shown, includes a tubular boss centrally thereof provided with a pair of notches 37 along diametrically opposed portions of its inner side wall forming the female portion of bayonet mounting means. This means is part of a fast-action coupling for lockout device 18, the inner end of which carries a pin 20 forming the male part of the bayonet mounting, as coupling, well known in the coupling art. As has been pointed out, the shank of lockout member 18 is threaded and projects loosely through the vent and access opening 39 axially of the end wall of casing 12. This opening is normally closed as by the plastic plug 40.

With reference now to both FIGURES 2 and 3, the operation of the pneumatic brake setting structure will be set forth. As described heretofore, assuming that pressurized air is maintained in the front portion of the chamber 30, the powerful spring means 38 and diaphragm 32 will remain in the positions illustrated in FIGURE 2. Since the front portion of the rigid force transmitting means 33 engaging the rear of the first diahragm 26 is not secured to the diaphragm 26, the diaphragm 26 and rod means 15 are free to move to extended or retracted positions independently of the rigid force transmitting member 33. Thus, the normal pneumatic operation of the brakes may be carried out.

When it is desired to set the brakes as for parking or in the event that the pressurized air system fails, the decreased pressure within the second chamber 30 resulting from exhausting the air therefrom or from a failure in the pressure line will enable the powerful spring means 38 to urge the second diaphragm 32 towards the left, thus moving the rigid force transmitting member 33 through the opening 31 to, in turn, push the first diaphragm 26 and rod means 15 from the end of the casing. This action is illustrated in FIGURE 3 wherein the rod means 15 has been partially extended from the front end of the casing.

In order for the driver to release the brakes when they are set in this emergency condition, he need only apply pressurized air through the inlet port 24' to bear against the front surface of the second diaphragm 32 and compress the powerful springs 38. However, in the event of loss of pressurized air due to the mechanical failure in the compressor or a leak in the hydraulic or pneumatic lines, the mechanical brake releasing means described in conjunction with FIGURE 1 in the form of the stud 18 and nut 19 may be used. Thus, the small plastic plug cap 40 is removed and the stud 18 removed from the pocket 17 and inserted into the access opening 39 as illustrated in FIGURE 3. The engaging projections 20 on the end of the stud 18 are then hooked into the hook portion 37 of the plate 36 and the nut 19 then threaded on the opposite protruding end of the stud. The diameter of the nut is larger than the access opening so that continued threading of the nut onto the stud will draw the plate 36 to the right thereby compressing the powerful spring 38. Compression of the spring 38 enables the force transmitting member 33 to be retracted by the spring 35 and thus enables the retraction of the rod means 15.

When pressurized air has been restored to the system, the diaphragm 32 will serve to hold the springs 38 compressed so that the stud 18 may then readily be disengaged and removed from the access opening 39. The plastic plug 40 is inserted in the access opening and the stud and nut are then replaced within the pocket structure 17 of FIGURE 1.

It will be noted from the foregoing description that the mechanical compressing of the powerful springs 38 can readily be effected without the necessity of providing permanent mechanical compressing means on the rear portion of the casing. Thus, the feature of mounting the mechanical spring compressing means on the side of the casing enables the overall length of the casing to be materially decreased. The length of the casing is only increased when the stud and nut are actually in use.

In addition to the foregoing, it will be noted that the powerful spring means 38 is in the form of a helical coil spring of barrel configuration. With this design, the end coils of the spring may fit within the center coils, as illustrated in FIGURE 2, when the spring is in compressed condition, thereby again enabling the overall length of the casing structure to be considerably shortened.

From the foregoing description, it will thus be evident that the present invention has provided a greatly improved pneumatically operated brake setting means with emergency mechanical actuator therefor. While only the one particular embodiment has been set forth for purposes of illustration, various minor changes that fall clearly within the scope and spirit of this invention will occur to those skilled in the art. The brake setting structure is therefore not to be thought of as limited to the exact embodiment set forth merely of illustrative purposes.

We claim:

1. In combination with a brake operating booster, means for operating said booster mechanically comprising a housing attached to the booster, means therein including an operating connection to said booster to operate the latter upon failure of the normal operating means therefor, said last-mentioned means including a generally flat, imperforate flexible diaphragm, powerful coil spring means having one end seated against the interior wall of said housing and a bearing plate floatingly supported against the diaphragm by said spring means, said bearing plate being constructed and defined with temporary holding means for accepting a spring lockout tool when substantially aligned with the axis of the spring and facing toward the housing wall seating said spring end, said housing having an opening aligned with the axis of said spring and the temporary holding means for the bearing plate, a spring lockout tool for extending through said opening for engagement with the temporary holding means to allow the lockout tool to be operated for compressing the locking out the spring mechanically when the spring is either in a compressed or an expanded condition, a removable cap for said housing opening to seal off the interior of the housing when the lockout tool is disengaged from the temporary holding means and withdrawn from the housing, said lockout tool comprising a threaded shank insertable through said housing opening and having one end thereof constructed and defined to detachably interlock with the temporary holding means, said threaded shank having nut means on its other end engageable with the exterior of said housing and cooperating therewith as the nut means is tightened to compress said spring, said housing is provided with a tool storage pocket for receiving and storing the major portion of the lockout tool for protecting same from its environment to thereby maintain the tool in a convenient and readily accessible location in a useable condition when the spring is required to be locked out, said tool being tightly secured to the pocket to prevent loss of same during operation of the associated vehicle by the nut being tightened to the pocket and released from the pocket by untightening the nut and withdrawing the tool from the pocket.

2. In a combination as defined in claim 1 wherein the detachable interlock for said lockout tool comprises a pin extending transversely of the threaded shank for coaction with said temporary holding means to allow for quick engagement and disengagement with the temporary holding means through rotation of the tool in one direction to cause the pin to be held by said temporary holding means and rotated in the opposite direction to be released therefrom, and wherein said bearing plate has a boss defined substantially centrally thereof having the temporary holding means constructed and defined on the boss to accept the cross pin and hold same upon rotation of the shank to seat the cross pin thereagainst and to release same upon rotation in the opposite direction.

References Cited by the Examiner

UNITED STATES PATENTS

| | | | |
|---|---|---|---|
| 1,429,024 | 9/1922 | Douglass | 254—10.5 |
| 2,976,085 | 3/1961 | Grogan | 92—63 |
| 3,107,583 | 10/1963 | Woodward | 92—63 |
| 3,109,347 | 11/1963 | Brodl et al. | 92—128 |
| 3,112,959 | 12/1963 | Kateley | 92—128 |
| 3,152,521 | 10/1964 | Cruse | 92—128 |

MARTIN P. SCHWADRON, *Primary Examiner.*

I. C. COHEN, *Assistant Examiner.*